US012585302B2

(12) United States Patent
Kim

(10) Patent No.: US 12,585,302 B2
(45) Date of Patent: Mar. 24, 2026

(54) DISPLAY APPARATUS

(71) Applicant: LG DISPLAY CO., LTD., Seoul (KR)

(72) Inventor: Sangwon Kim, Busan (KR)

(73) Assignee: LG DISPLAY CO., LTD., Seoul (KR)

( * ) Notice: Subject to any disclaimer, the term of this patent is extended or adjusted under 35 U.S.C. 154(b) by 846 days.

(21) Appl. No.: 17/897,860

(22) Filed: Aug. 29, 2022

(65) Prior Publication Data

US 2023/0070260 A1      Mar. 9, 2023

(30) Foreign Application Priority Data

Aug. 30, 2021      (KR) ......................... 10-2021-0114897

(51) Int. Cl.
B60R 21/04 (2006.01)
B60R 21/045 (2006.01)
G06F 1/16 (2006.01)
B60K 37/20 (2024.01)

(52) U.S. Cl.
CPC .......... G06F 1/1601 (2013.01); B60R 21/045 (2013.01); B60K 37/20 (2024.01)

(58) Field of Classification Search
CPC ...... B60K 37/20; G06F 1/1601; B60R 21/045
USPC ......................................................... 296/70
See application file for complete search history.

(56) References Cited

U.S. PATENT DOCUMENTS 9,164,537 B2 * 10/2015 Tsen ......................... G07G 1/00
9,927,642 B2    3/2018 Larry et al.

| | | | | |
|---|---|---|---|---|
| 11,054,685 | B2 * | 7/2021 | Faraj ...................... | B60K 37/00 |
| 12,005,781 | B2 * | 6/2024 | Matthews .............. | B60K 35/50 |
| 2011/0043978 | A1 * | 2/2011 | Bremmon ............ | G06F 1/1601 |
| | | | | 361/679.01 |

FOREIGN PATENT DOCUMENTS

| | | | |
|---|---|---|---|
| CN | 106256592 | A | 12/2016 |
| JP | 2003-327155 | A | 11/2003 |
| JP | 2005-335408 | A | 12/2005 |
| JP | 2007-90965 | A | 4/2007 |
| JP | 2013-82362 | A | 5/2013 |
| JP | 2020-121657 | A | 8/2020 |
| JP | 2020121657 | * | 8/2020 |
| KR | 10-2006-0069761 | A | 6/2006 |
| KR | 10-2010-0040041 | A | 4/2010 |
| KR | 10-1482465 | B1 | 1/2015 |

* cited by examiner

*Primary Examiner* — Joseph D. Pape

(74) *Attorney, Agent, or Firm* — Birch, Stewart, Kolasch & Birch, LLP

(57)      ABSTRACT

A display apparatus includes a display panel; and a rear cover coupled to a rear face of the display panel to support the display panel, the rear cover includes a protrusion protruding from the rear cover and including a fastening hole defined therein and fastened with coupling means, and the length of the fastening hole in a first direction is greater than a length of the fastening hole in a second direction orthogonal to the first direction. In the display apparatus, the protrusion moves in response to an external force, so that the display apparatus having the protrusion can effectively absorb the external impact to suppress damage to the display apparatus.

11 Claims, 7 Drawing Sheets

10

100

DISPLAY APPARATUS

CROSS-REFERENCE TO RELATED APPLICATIONS

This application claims priority under 35 U.S.C. § 119 to Korean Patent Application No. 10-2021-0114897 filed on Aug. 30, 2021 in the Republic of Korea, the entire contents of which are herein incorporated by reference into the present application.

BACKGROUND OF THE DISCLOSURE

Technical Field

The present disclosure relates to a display apparatus, and more particularly, to a display apparatus having a structure to effectively cope with an external impact.

Description of the Related Art

Contents described in this Background section simply provide background information about the present disclosure and do not constitute the prior art.

As we enter a full-fledged information era, a display apparatus that visually expresses an electrical information signal has developed rapidly. In response thereto, various display apparatuses having excellent performance, thinness, light weight, and low power consumption have been developed.

The display apparatus include a liquid crystal display apparatus (LCD), a quantum dot (QD) display apparatus, a field emission display apparatus (FED), an electro-wetting display apparatus (EWD), and an organic light-emitting display apparatus (OLED), etc.

The display apparatus is miniaturized so that the apparatus can be carried by a user. The display apparatus has been developed to be mounted on a movable apparatus such as a vehicle. Thus, the user can use the display apparatus on the vehicle more conveniently.

SUMMARY OF THE DISCLOSURE

When a display apparatus is mounted on a movable apparatus (e.g., a vehicle, a bicycle, an airplane, etc.), an impact that can be received from the outside by a movement can be transmitted to the display apparatus.

Due to the external impact, the display apparatus can be deformed or, in severe cases, can be damaged due to the external impact. When the damage is severe, fragments of the display apparatus can injure the user on board the vehicle (e.g., movable apparatus).

Even when such display apparatus is not damaged when the display apparatus receives the external impact, a malfunction, a failure, and the like of the display apparatus can occur due to the external impact.

In particular, in a case of a display apparatus having a slim structure or a display apparatus having a display having a flexible structure that is bent, the effect of the external impact can be greater.

Therefore, in the case of the display apparatus mounted on the movable apparatus, such as the vehicle, it is required to manufacture a display apparatus having a structure that can withstand the external impact stably.

Therefore, a purpose of the present disclosure is to provide a display apparatus having a structure that can effectively cope with the external impact.

Further, a purpose of the present disclosure is to provide a display apparatus having a structure that can suppress damage by allowing a fastening portion to move when receiving an external impact.

Purposes of the present disclosure are not limited to the above-mentioned purpose. Other purposes and advantages of the present disclosure that are not mentioned can be understood based on following descriptions, and can be more clearly understood based on embodiments of the present disclosure. Further, it will be easily understood that the purposes and advantages of the present disclosure can be realized using means shown in the claims and combinations thereof.

A display apparatus can include a display panel on which an image or a video is displayed. The display apparatus can include a rear cover that supports the display panel by being coupled to a rear face of the display panel.

The rear cover can be coupled to a portion of the rear face of the display panel and the rear panel supports the display panel, and the rear cover itself can be coupled to a dashboard (e.g., fixture) of a vehicle (e.g., movable apparatus). For the coupling with the dashboard, the rear cover can have a protrusion.

The rear cover can include a first bracket and a second bracket. The first bracket can protrude from the rear cover. The second bracket can protrude from the rear cover and can be disposed at a position spaced apart from the first bracket.

In order to stably couple the display apparatus to the dashboard, the protrusion can also be formed on the first bracket and the second bracket. The first bracket can include a protrusion that protrudes from the first bracket and the protrusion of the first bracket can have a fastening hole defined therein. The second bracket can include a protrusion that protrudes from the second bracket and the protrusion of the second bracket can have the fastening hole defined therein.

The fastening hole defined in the protrusion can be defined such that a diameter of the protrusion in a first direction is greater than a diameter of the protrusion in a second direction orthogonal to the first direction.

The display apparatus according to one embodiment can include a display panel and a rear cover coupled to a rear face of the display panel to support the display panel, the rear cover can include a protrusion protruding from the rear cover and having a fastening hole defined therein and fastened with coupling means, and the fastening hole can be defined such that a diameter of the protrusion in a first direction is greater than a diameter of the protrusion in a second direction orthogonal to the first direction.

In the display apparatus according to the present disclosure, the protrusion moves in response to an external impact, so that the display apparatus having the protrusion can effectively absorb the external impact to suppress damage.

Further, in the display apparatus according to the present disclosure, the fastening hole can be composed of a first cell and a second cell separated from each other by a deformable portion, and the deformable portion can be deformed or damaged when the external impact is applied to the display apparatus to buffer the impact applied on the display apparatus, thereby effectively suppressing the damage of the display apparatus.

Accordingly, durability of the display apparatus can be improved, and safety of a user can be improved by suppressing (e.g., prohibiting, eliminating, etc.) fragments from being generated by the damage to the display apparatus, and thus injury to the user can be suppressed (e.g., mitigated, eliminated, etc.).

In addition to the above-described effects, specific effects of the present disclosure will be described together while describing specific details for carrying out the invention below.

Effects of the present disclosure are not limited to the above-mentioned effects, and other effects as not mentioned will be clearly understood by those skilled in the art from following descriptions.

The purposes, solutions, and effects of the disclosure as described above does not specify essential features of claims. Thus, the scope of claims is not limited by the purposes, solutions, and effects of the disclosure as described above.

DETAILED DESCRIPTION OF THE EMBODIMENTS

Figure 1:
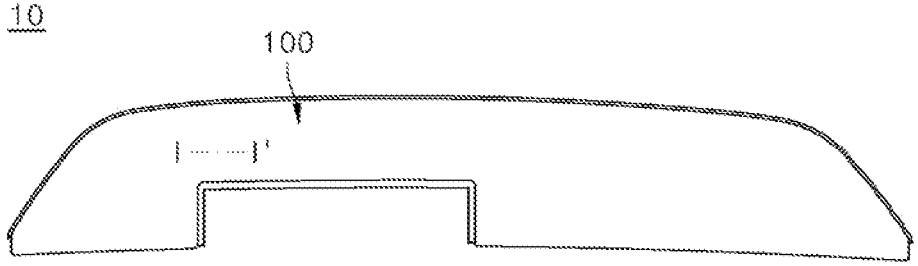
FIG. 1 is a front view showing a display apparatus according to an embodiment.

Advantages and features of the present disclosure, and how to achieve them will become apparent with reference to the embodiments described below in detail in conjunction with the accompanying drawings. However, the present disclosure is not limited to the embodiments as disclosed below, but will be implemented in a variety of different forms. Only these embodiments make the present disclosure complete, and are constructed to fully inform those having common knowledge in the technical field to which the present disclosure belongs of a scope of the disclosure. The scope of the present disclosure is only defined by the scope of the claims.

A shape, a size, a ratio, an angle, a number, etc. disclosed in the drawings for illustrating embodiments of the present disclosure are exemplary, and the present disclosure is not limited thereto. The same reference numerals refer to the same elements herein. Further, in describing the present disclosure, when it is determined that a detailed description of a related known element can unnecessarily obscure gist of the present disclosure, the detailed description thereof will be omitted. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof.

In interpreting a numerical value, the value is interpreted as including an error range unless there is no separate explicit description thereof.

It will be understood that when an element or layer is referred to as being "connected to", or "coupled to" another element or layer, it can be directly on, connected to, or coupled to the other element or layer, or one or more intervening elements or layers can be present. In addition, it will also be understood that when an element or layer is referred to as being "between" two elements or layers, it can be the only element or layer between the two elements or layers, or one or more intervening elements or layers can also be present. In addition, it will also be understood that when a first element or layer is referred to as being present "on" or "beneath" a second element or layer, the first element can be disposed directly on or beneath the second element or can be disposed indirectly on or beneath the second element with a third element or layer being disposed between the first and second elements or layers.

Further, as used herein, when a layer, film, region, plate, or the like is disposed "on" or "on a top" of another layer, film, region, plate, or the like, the former can directly contact the latter or still another layer, film, region, plate, or the like can be disposed between the former and the latter. As used herein, when a layer, film, region, plate, or the like is directly disposed "on" or "on a top" of another layer, film, region, plate, or the like, the former directly contacts the latter and still another layer, film, region, plate, or the like is not disposed between the former and the latter. Further, as used herein, when a layer, film, region, plate, or the like is disposed "below" or "under" another layer, film, region, plate, or the like, the former can directly contact the latter or still another layer, film, region, plate, or the like can be disposed between the former and the latter. As used herein, when a layer, film, region, plate, or the like is directly disposed "below" or "under" another layer, film, region, plate, or the like, the former directly contacts the latter and still another layer, film, region, plate, or the like is not disposed between the former and the latter.

In descriptions of temporal relationships, for example, temporal precedent relationships between two events such as "after", "subsequent to", "before", etc., another event can occur therebetween unless "directly after", "directly subsequent" or "directly before" is not indicated.

It will be understood that, although the terms "first", "second", "third", and so on can be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

The features of the various embodiments of the present disclosure can be partially or entirely combined with each other, and can be technically associated with each other or operate with each other. The embodiments can be implemented independently of each other and can be implemented together in an association relationship.

In descriptions of temporal relationships, for example, temporal precedent relationships between two events such as "after", "subsequent to", "before", etc., another event can occur therebetween unless "directly after", "directly subsequent" or "directly before" is not indicated. The features of the various embodiments of the present disclosure can be partially or entirely combined with each other, and can be technically associated with each other or operate with each other. The embodiments can be implemented independently of each other and can be implemented together in an association relationship. Spatially relative terms, such as "beneath," "below," "lower," "under," "above," "upper," and the like, can be used herein for ease of explanation to describe one element or feature's relationship to another element or feature as illustrated in the figures. It will be understood that the spatially relative terms are intended to encompass different orientations of the apparatus in use or in operation, in addition to the orientation depicted in the figures. For example, when the apparatus in the drawings can be turned over, elements described as "below" or "beneath" or "under" other elements or features would then be oriented "above" the other elements or features. Thus, the example terms "below" and "under" can encompass both an orientation of above and below. The apparatus can be otherwise oriented for example, rotated 90 degrees or at other orientations, and the spatially relative descriptors used herein should be interpreted accordingly.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A Cartesian coordinate system can be used in drawings. In the Cartesian coordinate system, a z-axis direction represents the first direction, a y-axis direction represents the second direction, and an x-axis direction represents the third direction.

A display apparatus 10 according to an embodiment can be mounted on a mobile apparatus (e.g., a vehicle) to provide convenience to a user. Hereinafter, the display apparatus 10 mounted on a dashboard of the vehicle will be described by way of example.

The display apparatus according to an embodiment can include, for example, a liquid crystal display apparatus (LCD), a quantum dot (QD) display apparatus, a field emission display apparatus (FED), an electrowetting display apparatus (EWD), and an organic light-emitting display apparatus (OLED), etc. However, the present disclosure is not limited thereto.

FIG. 1 is a front view showing the display apparatus 10 according to an embodiment. The display apparatus 10 can include a display panel 100 on which an image or a video is displayed. The display panel 100 can generally have a rectangular or square shape, but may not be limited thereto, and can have a shape having acute-angled or obtuse-angled outlines or a curved outline.

Figure 2:
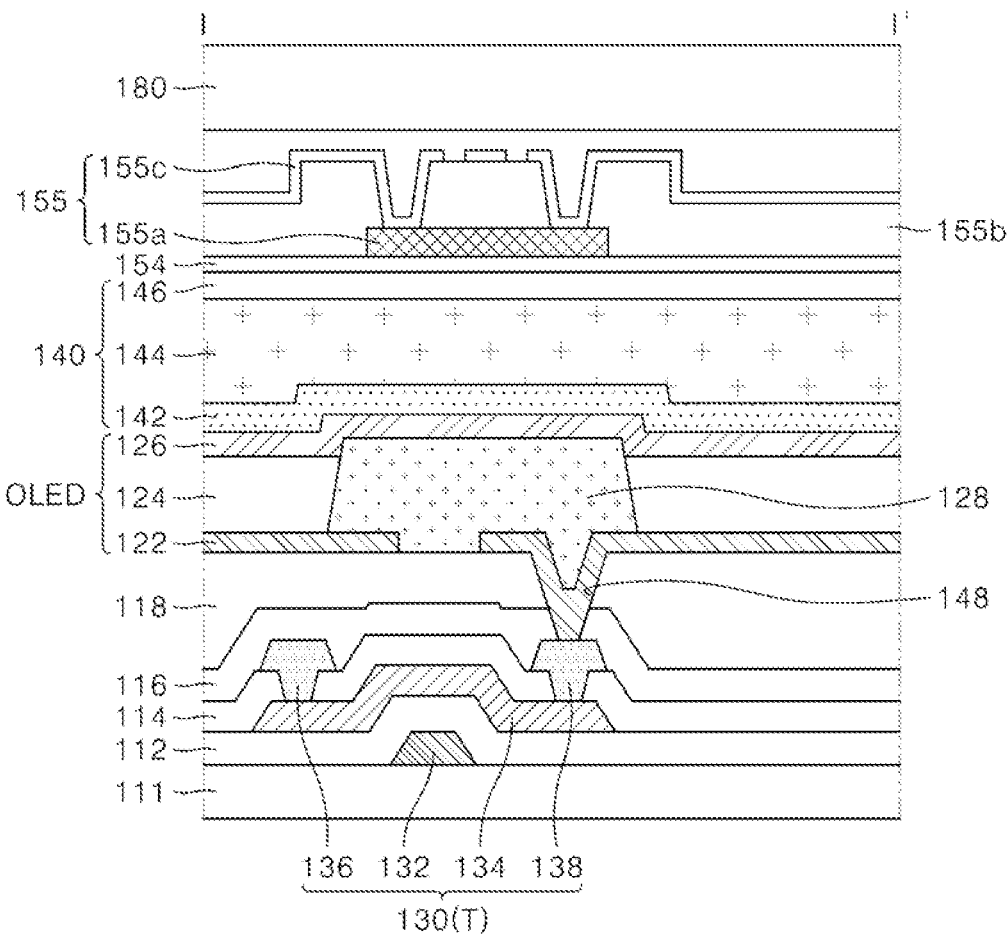
FIG. 2 is a view showing a portion I-I' in FIG. 1.

FIG. 2 is a view showing a portion I-I' in FIG. 1.

Referring to FIGS. 1 and 2, a substrate 111 can support various components of the display panel 100. The substrate 111 can be made of a transparent insulating material, for example, an insulating material such as glass, plastic, or the like. When the substrate 111 is made of the plastic, the substrate 111 can be a plastic film or a plastic substrate. For example, the substrate 111 can be in a form of a film containing one or more of a polyimide-based polymer, a polyether-based polymer, a silicone-based polymer, an acryl-based polymer, a polyolefin-based polymer, and a copolymer thereof. Among such materials, because the polyimide can be applied to a high-temperature process and can be coated, the polyimide can be used as the plastic substrate.

A buffer layer can be located on the substrate 111. The buffer layer can protect a thin-film transistor (TFT) from impurities such as an alkali ion leaking from a bottom of the substrate 111. The buffer layer can be made of a silicon oxide (SiOx), a silicon nitride (SiNx), or can be composed of multiple layers thereof, but the present disclosure may not be limited thereto.

A thin-film transistor 130 (i.e., 130(T)) can be disposed on the buffer layer. A gate electrode 132, a gate insulating layer 112, a semiconductor layer 134, an interlayer insulating layer 114, and source and drain electrodes 136 and 138 can be sequentially disposed to constitute the thin-film transistor 130. At least one thin-film transistor 130 can be disposed in a plurality of sub-pixels disposed in an active area.

Although the thin-film transistor 130 shown in FIG. 2 applies a bottom gate scheme, the present disclosure is not limited thereto, and a top gate scheme in which orders of the semiconductor layer 134 and the gate electrode 132 are changed is applicable.

The semiconductor layer 134 can be disposed on a specific portion of the substrate 111 or the buffer layer. The semiconductor layer 134 can be made of polysilicon (p-Si). In this case, a portion of the semiconductor layer 134, which is an area to become an electrode layer, can be doped with impurities. Further, the semiconductor layer 134 can be made of amorphous silicon (a-Si), and can be made of various organic semiconductor materials such as pentacene. As another example, the semiconductor layer 134 can be made of an oxide. The gate insulating layer 112 can be made of an insulating inorganic material such as the silicon oxide (SiOx) or the silicon nitride (SiNx), or can be made of an insulating organic material. The gate electrode 132 can be made of various conductive materials, for example, magnesium (Mg), aluminum (Al), nickel (Ni), chromium (Cr), molybdenum (Mo), tungsten (W), gold (Au), or an alloy thereof, but the present disclosure may not be limited thereto.

The first interlayer insulating layer 114 can be made of the insulating material such as silicon oxide (SiOx) or the silicon nitride (SiNx), or can be made of the insulating organic material. By selectively removing the first interlayer insulating layer 114, a contact hole through which source and drain areas are exposed can be defined.

The source and drain electrodes 136 and 138 can be formed in a form of a single layer or multiple layers of a material for an electrode on the first interlayer insulating layer 114.

While covering the source and drain electrodes 136 and 138, an inorganic passivation layer 116 and a planarization layer 118 can be positioned on the thin-film transistor. The inorganic passivation layer 116 and the planarization layer 118 protect the thin-film transistor and planarize a top of the thin-film transistor. The inorganic passivation layer 116 can be formed as an inorganic insulating film, such as a silicon nitride film (SiNx) and a silicon oxide film (SiOx), and the planarization layer 118 can be formed as an organic insulating film, such as BCB (benzocyclobutene) or acryl. Each of the inorganic passivation layer 116 and the planarization layer 118 can be composed of a single layer or can be composed of double or multiple layers, and one of the inorganic passivation layer 116 and the planarization layer 118 can be omitted.

A light-emitting element connected to the thin-film transistor (TFT) 130 can have a form in which a first electrode 122, an organic light-emitting layer 124, and a second electrode 126 are sequentially disposed. For example, the light-emitting element can be composed of the first electrode 122 connected to the drain electrode 138 through a contact hole 148 defined in the planarization layer 118 and the inorganic passivation layer 116, the organic light-emitting layer 124 located on the first electrode 122, and the second electrode 126 located on the organic light-emitting layer 124.

When the display panel 100 applies a top emission scheme in which light is emitted from a top of the second electrode 126 (e.g., towards the cover member 180), the first electrode 122 can contain an opaque conductive material with high reflectivity. The reflective conductive material can be, for example, silver (Ag), aluminum (Al), gold (Au), molybdenum (Mo), tungsten (W), chromium (Cr), or an alloy thereof, but the present disclosure may not be limited thereto.

A bank 128 opens a light-emitting area and is formed in a remaining area except for the light-emitting area. Accordingly, the bank 128 has a bank hole exposing the first electrode 122 corresponding to the light-emitting area. The bank 128 can be made of the inorganic insulating material such as the silicon nitride film (SiNx) or the silicon oxide film (SiOx), or the organic insulating material such as the BCB, an acrylic-based resin or an imide-based resin.

The organic light-emitting layer 124 is placed on the first electrode 122 exposed by the bank 128. The organic light-emitting layer 124 can include a hole injection layer, a hole transport layer, a light-emitting layer, an electron transport layer, an electron injection layer, and the like. Further, the organic light-emitting layer 124 can have a single light-emitting layer structure that emits one beam of light in a single stack, or can have a multi-stack structure including multiple stacks and including a single light-emitting layer of the same color in each stack. In this case, for display of various colors, adjacent sub-pixels can be arranged to emit beams of light with different colors. For example, sub-pixels having red, green, and blue light-emitting layers can be sequentially arranged side by side, or can be arranged to be spaced apart from each other and have a triangular shape, a pentile structure, or the like in which two sub-pixels of specific colors are parallel to each other and another sub-pixel is disposed diagonally.

As another example, an arrangement of white sub-pixels can be added. White can be expressed by stacking multiple stacks including light-emitting layers that emit light of different colors with an additional arrangement structure of the organic light-emitting layer 124. When the white is expressed with the stack structure, a separate color filter can be added to each sub-pixel.

The second electrode 126 is placed on the organic light-emitting layer 124. When the display panel 100 applies the top emission scheme, the second electrode 126 can be made of a transparent conductive material, such as an indium tin oxide (ITO), an indium zinc oxide (IZO), and the like or can be made of a semi-transmissive metal or metal alloy, such as MgAg, to emit the light generated by the organic light-emitting layer 124 from the top of the second electrode 126.

A capping layer can be disposed on the second electrode 126. The capping layer can protect the light-emitting element, and can apply a material with a good refractive index to help the extraction of light coming out of the second electrode 126.

An encapsulation layer 140 can be disposed on the light-emitting element. The encapsulation layer 140 blocks penetration of oxygen and moisture from the outside in order to prevent oxidation of the light-emitting material and the electrode material. When the light-emitting element is exposed to the moisture or the oxygen, a pixel shrinkage phenomenon in which the light-emitting area is reduced can occur or a dark spot in the light-emitting area can appear. The encapsulation layer 140 can be formed by an alternating first and second inorganic layers 142 and 146 made of glass, metal, an aluminum oxide (AlOx), or a silicon (Si)-based material, and an organic layer 144 that serves as a buffer to relieve stress between layers (e.g., the first and second inorganic layers 142 and 146) resulted from bending of the display panel 100 and enhances a planarization performance. That is, the first and second inorganic layers 142 and 146 can be made of glass, metal, an aluminum oxide (AlOx), or a silicon (Si)-based material. A component of the organic layer 144 can be the organic insulating material such as the acrylic resin, an epoxy resin, polyimide, polyethylene, or silicon oxycarbon (SiOC). The first and second inorganic layers 142 and 146 serve to block the penetration of moisture or oxygen, and the organic layer 144 serves to planarize a surface of the first inorganic layer 142. When the encapsulation layer 140 is composed of multiple thin-film layers, a flow passage of the moisture or the oxygen can become longer and more complicated than that of a single layer, which can make it difficult for the moisture/oxygen to penetrate the light-emitting element.

A passivation layer can be further formed between the light-emitting element and the encapsulation layer 140 to protect the encapsulation layer 140 such that a side face of the encapsulation layer 140 is not peeled during a manufacturing process of the encapsulation layer 140 or an uniformity thereof is not affected.

Referring to FIG. 2, a polarization layer 154 can be disposed on the encapsulation layer 140. The polarization layer 154 can minimize an effect on the semiconductor layer 134 or the light-emitting layer 124 of light generated from an external light source and entering the display panel 100.

Referring to FIG. 2, a touch sensor layer 155 can be disposed on the polarization layer 154. The touch sensor layer 155 can have a structure in which a first touch electrode 155a and a second touch electrode 155c are arranged to intersect (e.g., contact) each other, and a voltage signal is applied to one side (e.g., a first side) and the other side (e.g., a second side) senses the voltage signal. The first touch electrode 155a and the second touch electrode 155c can be patterned in a polygonal or circular shape (e.g., any shape) on a touch insulating layer 155b and disposed to be spaced apart from each other (e.g., the first touch electrode 155a can be spaced apart from the second touch electrode 155c).

A cover member 180 can be disposed on the touch sensor layer 155. An adhesive layer can be further disposed between the touch sensor layer 155 and the cover member 180 to bond the touch sensor layer 155 and the cover member 180 to each other.

Figure 3:
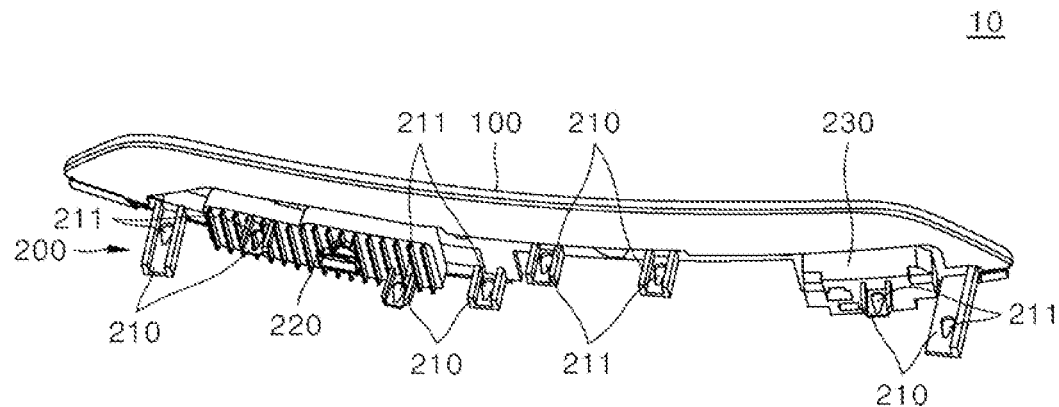
FIG. 3 is a perspective view showing a display apparatus according to an embodiment.

FIG. 3 is a perspective view showing the display apparatus 10 according to an embodiment. The display apparatus 10 can include a rear cover 200 that is coupled to a rear face (e.g., rear surface) of the display panel 100 to support the display panel 100.

The rear cover 200 can be coupled to a portion of the rear face of the display panel 100 and support the display panel 100, and the rear cover 200 itself can be coupled to the dashboard of the vehicle (or a fixture of a movable apparatus). For coupling the rear cover 200 to the dashboard, the rear cover 200 can have a protrusion 210.

Coupling means 1000, e.g. a screw bolt or the like can be coupled to the protrusion 210 and the coupling means 1000 is coupled to the dashboard, so that the display apparatus 10 can be stably coupled to the dashboard. In order for the display apparatus 10 to be stably coupled to the dashboard, a plurality of protrusions 210 can be disposed on the rear cover 200 and a plurality of coupling means 1000 may attach/couple the plurality of protrusions 210 of the rear cover 200 to the dashboard to attach/couple the rear cover 200 to the dashboard.

For example, the plurality of protrusions 210 can be disposed, and the protrusions 210 can be disposed to be spaced apart from each other on the rear cover 200. The protrusion(s) 210 can protrude from the rear cover 200 and can have a fastening hole 211 into which the coupling means 1000 is fastened defined therein.

The rear cover 200 can include a first bracket 220 and a second bracket 230. The first bracket 220 can protrude from the rear cover 200. The second bracket 230 can protrude from the rear cover 200 and be disposed at a position spaced apart from the first bracket 220.

The first bracket 220 and the second bracket 230 can have an apparatus necessary for electrical connection between the display apparatus 10 and an external power source, a controller (e.g., a hardware-embedded processor) of the vehicle, and other external apparatus. In order to stably connect the display apparatus 10 to a fixture (e.g., a dashboard), the protrusion 210 can be formed on the first bracket 220 and the second bracket 230 as well.

The first bracket 220 can include the protrusion 210 protruding from the first bracket 220 and having the fastening hole 211 defined therein. The second bracket 230 can include the protrusion 210 protruding from the second bracket 230 and having the fastening hole 211 defined therein.

The protrusions 210 disposed on the first bracket 220 and the second bracket 230 can include a plurality of protrusions spaced apart from each other, like the protrusion 210 disposed on the rear cover 200. In order to more stably couple the display apparatus 10 to the dashboard, the first bracket 220 and the second bracket 230 also include the plurality of protrusions 210 for the coupling.

Hereinafter, what is common to the protrusions 210 disposed on the rear cover 200, the first bracket 220, and the second bracket 230 will be described as the description of the protrusion 210. Therefore, for example, the description of the protrusion 210 disposed on the rear cover 200 can be applied to the protrusions 210 disposed on the first bracket 220 and the second bracket 230 unless otherwise specified.

Figure 4:
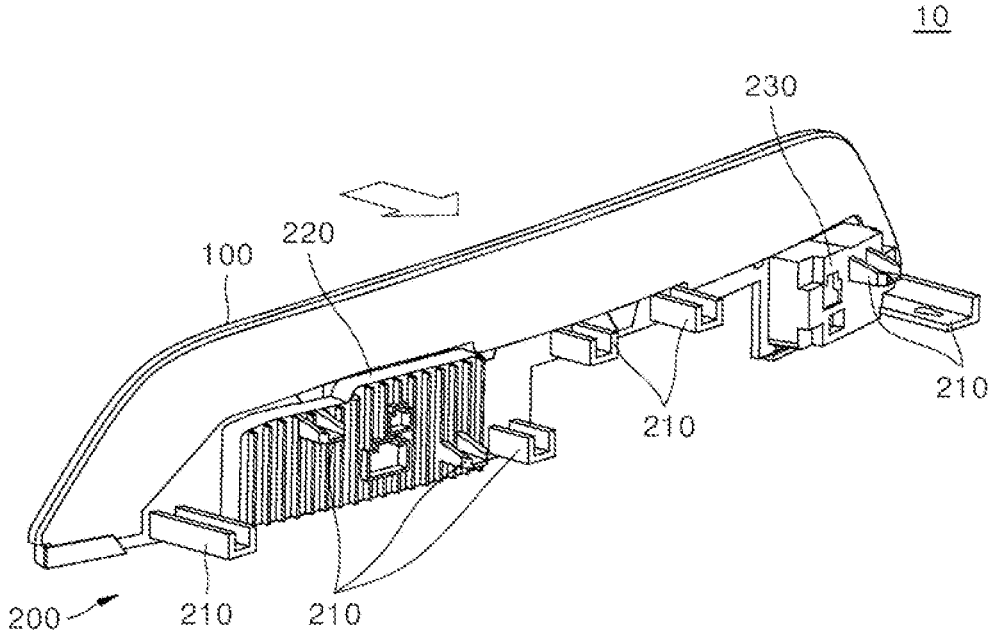
FIG. 4 is a perspective view of FIG. 3 viewed from another direction than that shown in FIG. 3.
Figure 4:

FIG. 4 is a perspective view of FIG. 3 viewed from another direction. The display apparatus 10 mounted on the vehicle can receive the external impact when the vehicle is operating. Mainly, when the vehicle stops suddenly due to an obstacle or a traffic accident, the external impact (e.g., a force due to the external impact or a force due to the vehicle suddenly accelerating or decelerating) can be applied to the display apparatus 10.

As shown by an arrow in FIG. 4, such external impact or force can be mainly applied in a front and rear direction (e.g., an axis passing through a front and a rear of the display panel 100) of the display apparatus 10 mounted on the dashboard of the vehicle, that is, a first direction. Therefore, hereinafter, a description will be made based on the first direction, which is the direction in which the external impact, which can cause damage to the display apparatus 10, is mainly applied.

Figure 5:
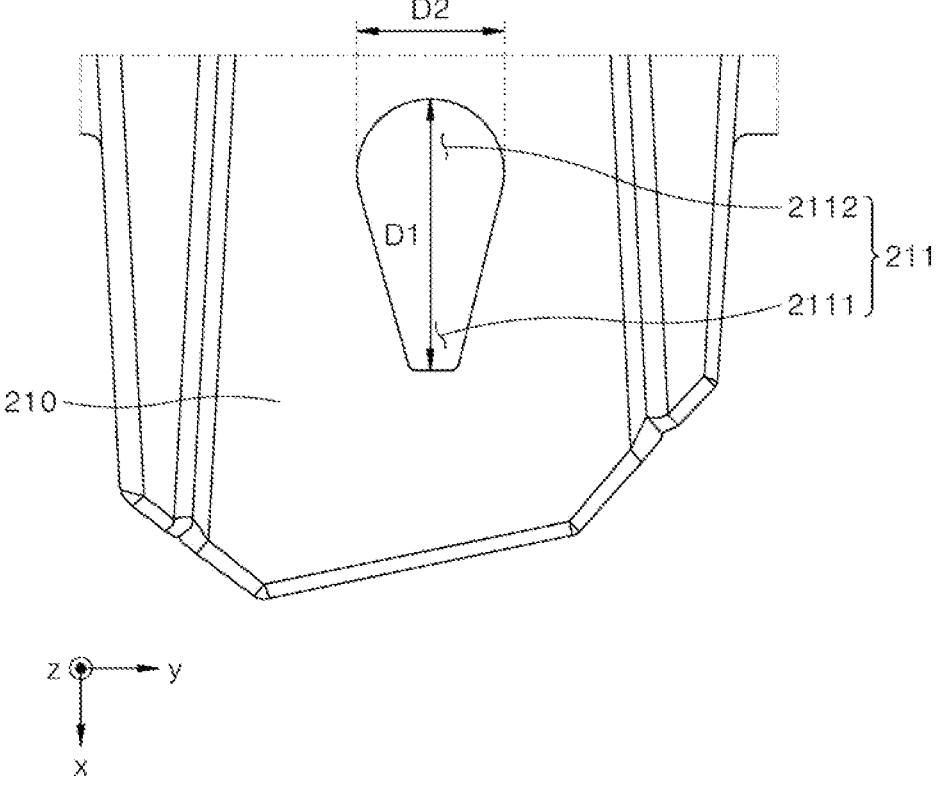
FIG. 5 is a partial enlarged view showing a protrusion and a fastening hole according to an embodiment.

FIG. 5 is a partial enlarged view showing the protrusion 210 and the fastening hole 211 according to an embodiment. In the fastening hole 211 defined in the protrusion 210, a diameter D1 (e.g., length) in the first direction can be greater than a diameter D2 (e.g., length) in a second direction orthogonal to the first direction. Because the diameter D1 in the first direction is great, the coupling means 1000 such as the screw bolt fastened to the fastening hole 211 can move in the first direction. Further, the fastening hole 211 can include multiple shapes, including a curved surface and multiple linear surfaces, as shown in FIG. 5 (e.g., a variable shape). The diameter D1 can represent a maximum diameter of the fastening hole 211 in the first direction, and the fastening hole 211 can have a diameter D1 that increases from a first end of the fastening hole toward a second end of the fastening hole in the first direction. The diameter D2 can represent a maximum diameter of the fastening hole 211 in the second direction, and the fastening hole 211 can have a diameter D2 that increases from the first end toward the second end. The second end of the fastening hole can have a semi-circular shape, as shown in FIG. 5

The diameter D2 in the second direction can increase or decrease in the first direction. For example, the fastening hole 211 can be defined such that the diameter D2 in the second direction decreases in a rearward direction of the display panel 100, that is, in a +x-axis direction from a point at which the diameter D2 in the second direction is maximum.

Referring to FIG. 5, for example, the diameter D2 in the second direction can increase in a −x-axis direction, that is, decrease in the +x-axis direction.

Due to such structure, the fastening hole 211 can be composed of a first area 2111, which has a relatively large diameter, and a second area 2112, which has a relatively small diameter compared to the first area 2111 and the diameter changes in the first direction.

The first direction can be parallel to the front and rear direction of the display panel 100. In order for a user to conveniently view the display panel 100 in the vehicle, the display panel 100 can be disposed such that the front and rear direction thereof is parallel to a front and rear direction of the vehicle.

As described above, the external impact mainly occurs in the front and rear direction of the vehicle during the operation of the vehicle, and therefore, the external impact (e.g., impact force, accelerating force, braking force, etc.) applied to the display apparatus 10 can also be mainly applied in the front and rear direction of the display panel 100, that is, the first direction.

Therefore, the first direction is in parallel with the front and rear direction of the display panel 100, so that the display panel 100 can move in the first direction by the fastening hole 211 defined long in the first direction to move in the first direction to respond to the direction in which the external impact is mainly applied.

Figure 6:
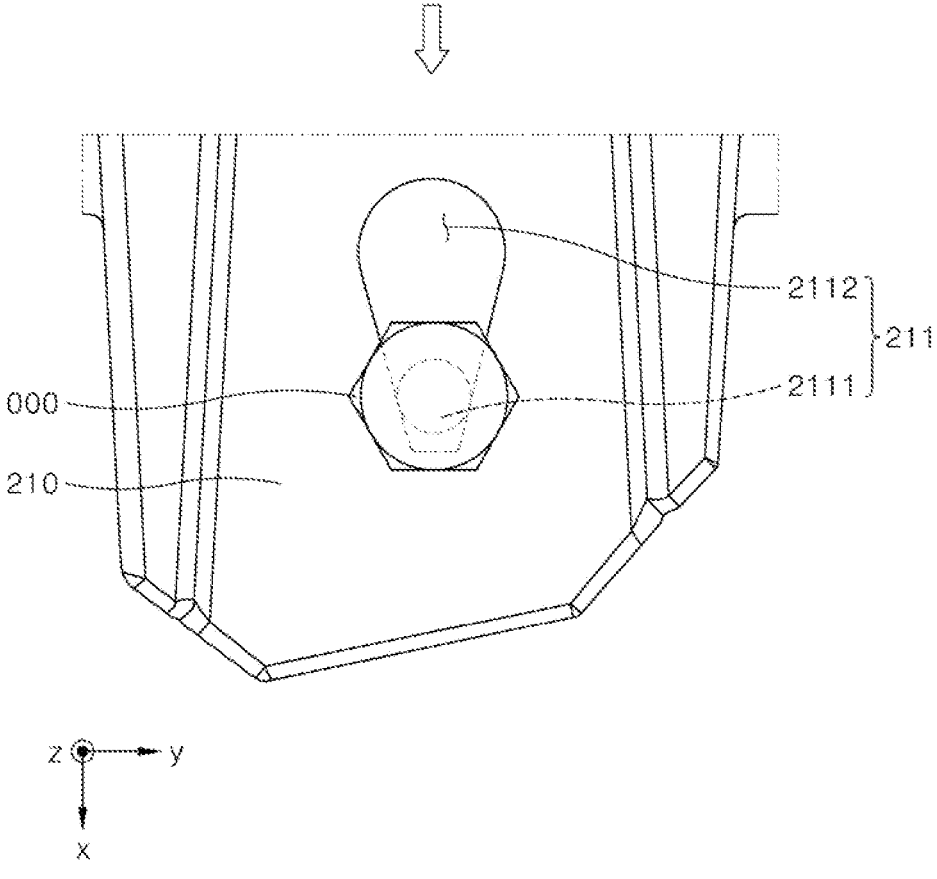
FIG. 6 is a partial enlarged view showing a state in which coupling means is fastened to a fastening hole defined in a protrusion according to an embodiment.
Figure 7:
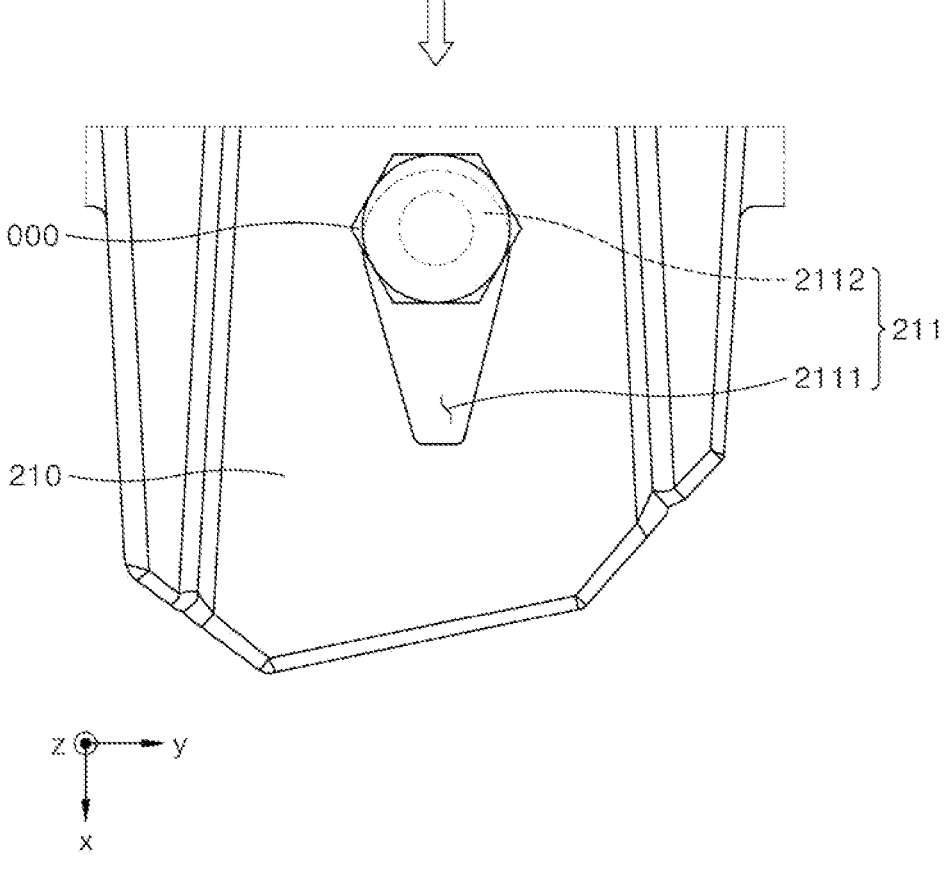
FIG. 7 is a diagram showing a moved state of coupling means in FIG. 6.

FIG. 6 is a partial enlarged view showing a state in which the coupling means 1000 is fastened to the fastening hole 211 defined in the protrusion 210 according to an embodiment. FIG. 7 is a diagram showing a moved state of the coupling means 1000 in FIG. 6. In FIGS. 6 and 7, an arrow indicates the direction in which the external impact is applied to the display apparatus 10.

In FIG. 6, the coupling means 1000 is fastened to the protrusion 210 and the dashboard (e.g., the coupling means 1000 can fasten the protrusion 210 to the dashboard or other fixture), and accordingly, the display apparatus 10 is coupled to the dashboard. In this regard, the coupling means 1000 is located in the first area 2111 of the fastening hole 211. In the state in FIG. 6, the external impact can be applied to the display apparatus 10 in the +x-axis direction as shown by the arrow.

When the external impact is applied to the display apparatus 10, the coupling means 1000 fixedly coupled to the dashboard maintains a position thereof, but the display apparatus 10 subjected to the external impact (e.g., external force) can move in the direction of the arrow.

Accordingly, as shown in FIG. 7, the protrusion 210 of the display apparatus 10 can move in the direction of the arrow that is illustrated, and accordingly, the coupling means 1000 can move in a direction opposite to the arrow, that is, the −x-axis direction, when viewed with respect to the protrusion 210.

The first area 2111 of the fastening hole 211 can be defined long in the first direction, and in particular, can increase in the diameter in the −x-axis direction. Due to such structure, the coupling means 1000 can move in the −x-axis direction, which is the direction in which the diameter increases, in response to the external impact applied in the direction of the arrow.

Accordingly, when the external impact is applied to the display apparatus 10 in the direction of the arrow, the display apparatus 10 can move in the +x-axis direction with respect to the coupling means 1000. As such, the display apparatus 10 can move in the first direction in response to the external impact (e.g., external force), and a movement range of the display apparatus 10 in the first direction can be determined by the diameter D1 in the first direction. That is, the movement range can equate to (e.g., be equal to) the diameter D1 of the fastening hole 211.

In one example, when the coupling means 1000 is fastened to the protrusion 210, it is preferable to properly adjust a fastening strength of the coupling means 1000 such that the protrusion 210 can move with respect to the coupling means 1000 only when a strength of the external impact is equal to or greater than a certain strength (e.g., the force applied to the display apparatus 10 is greater than a predetermined force).

In an embodiment, the protrusion 210 disposed on the display apparatus 10 moves in response to the external impact (e.g., external force), so that the display apparatus 10 having the protrusion 210 can effectively absorb the external impact to suppress the damage.

Figure 8:
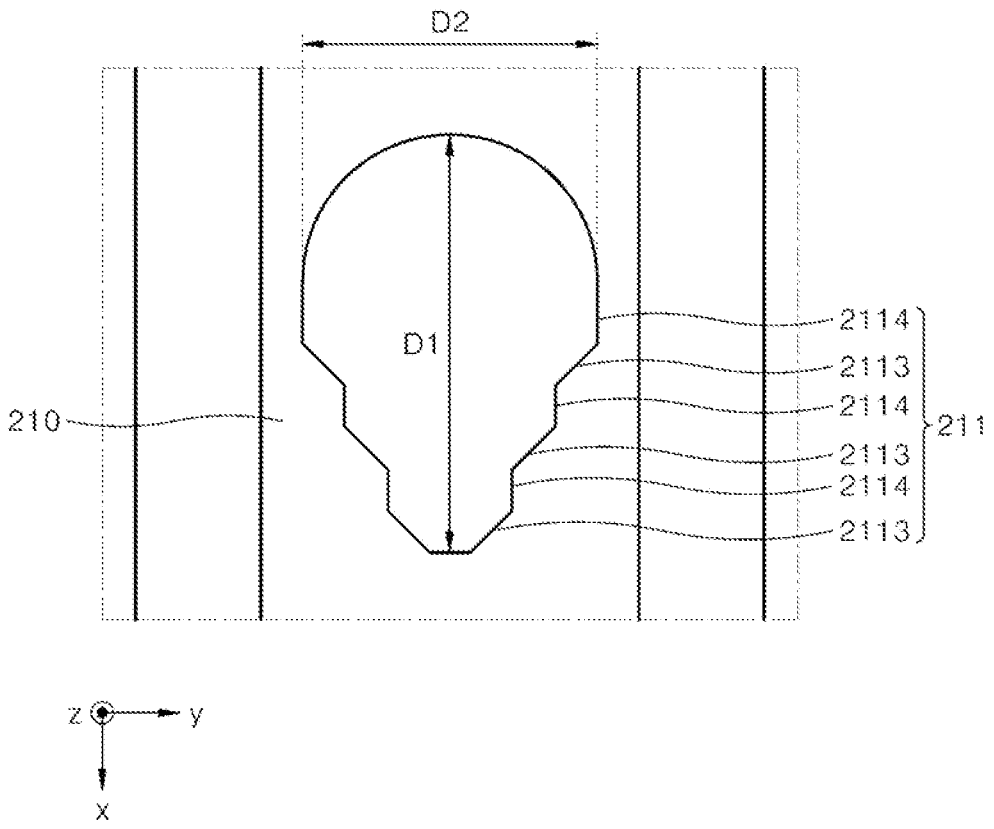
FIG. 8 is a partial enlarged view showing a protrusion and a fastening hole according to an embodiment.

FIG. 8 is a partial enlarged view showing the protrusion 210 and the fastening hole 211 according to an embodiment. Hereinafter, a description of contents of the fastening hole 211 shown in FIG. 8 duplicated with the contents of the fastening hole 211 described above will be omitted.

The fastening hole 211 of the embodiment shown in FIG. 8 can include a first portion 2113 and a second portion 2114. The first portion 2113 can decrease in the diameter D2 in the second direction in the rearward direction of the display panel 100 from a point at which the diameter D2 in the second direction is maximum. The first portion 2113 can have a linear shape and the second portion can have a linear shape.

In the second portion 2114, the diameter D2 in the second direction can be constantly maintained in the rearward direction of the display panel 100 from the point at which the diameter D2 in the second direction is maximum. In this regard, the first part 2113 and the second part 2114 can be alternately arranged along the first direction.

The fastening hole 211 of the embodiment shown in FIG. 8 can be defined such that, as the first portion 2113 and the second portion 2114 are alternately arranged, the diameter in the second direction is changed in a stepwise manner while having steps as a whole. That is, the fastening hole 211 can have a stepped shape (e.g., stepwise shape) due to alternately arranging the first portion 2113 and the second portion 2114.

Figure 9:
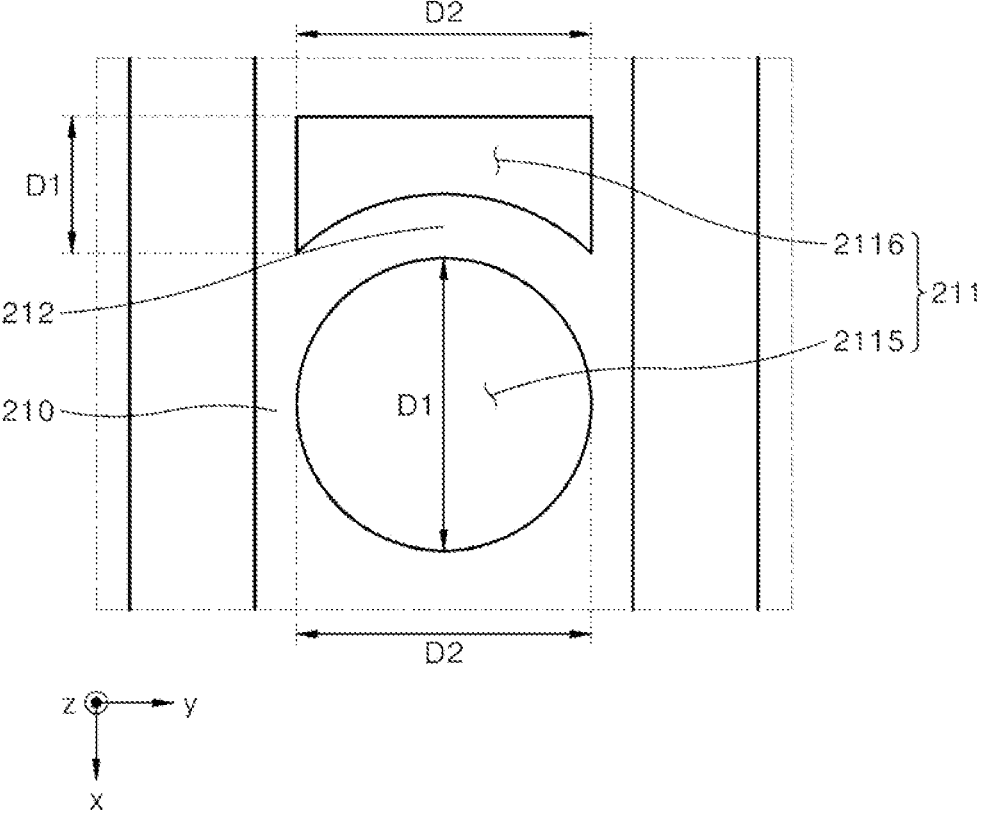
FIG. 9 is a partial enlarged view showing a protrusion and a fastening hole according to an embodiment.

FIG. 9 is a partial enlarged view showing the protrusion 210 and the fastening hole 211 according to an embodiment. The fastening hole 211 of the embodiment shown in FIG. 9 can include a first cell 2115 and a second cell 2116 that are separated from each other by a deformable portion 212 of the protrusion 210.

The first cell 2115 can be formed in an approximately circular shape, and the coupling means 1000 can be coupled thereto. Accordingly, the first cell 2115 can have the diameter D1 in the first direction and the same diameter D2 in the second direction that are the same. For instance, the first cell 2115 can have a circular shape having a diameter.

The second cell 2116 can be separated from the first cell 2115 and defined at a position spaced apart from the first cell 2115. In this regard, in the second cell 2116, the diameter D1 in the first direction can be smaller than the diameter D2 in the second direction.

The first cell 2115 and the second cell 2116 can be spaced apart from each other in the first direction. Therefore, when the external impact is applied to the display apparatus 10, the coupling means 1000 can move in the first direction.

The protrusion 210 can include the deformable portion 212 separating the first cell 2115 and the second cell 2116 of the fastening hole 211. The deformable portion 212 can be disposed between the first cell 2115 and the second cell 2116 to separate the first cell 2115 and the second cell 2116 from each other, and can be deformed (e.g., plastically deformed or elastically deformed) or damaged when the external force is applied to the display apparatus 10. For instance, the deformable portion 212 can be configured to absorb some or all of an external force applied to the display apparatus 10.

When the external impact is applied to the display apparatus 10 in the +x-axis direction, the protrusion 210 can move. Accordingly, relatively, the coupling means 1000 can move in the −x-axis direction with respect to the protrusion 210.

When the strength (e.g., force) of the external impact applied to the display apparatus 10 is relatively small, the deformable portion 212 can be deformed by receiving an external force by a fastening means, and the fastening means inserted into the first cell 2115 can be placed after moving in the −x-axis direction from an original fastening position.

When the strength of the external impact (e.g., the external force) applied to the display apparatus 10 is relatively great, the deformable portion 212 can be damaged by receiving the external force by the fastening means, and the fastening means inserted in the first cell 2115 can move in the −x-axis direction and can be at least partially placed in the second cell 2116.

The deformable portion 212 does not withstand the external impact, but is deformed or damaged by the external impact to relieve the impact applied to the display apparatus 10. Therefore, it is preferable to appropriately design a thickness and a width of the deformable portion 212 such that the deformation or the breakage occurs when the external impact having the strength equal to or greater than the certain strength is applied.

In an embodiment, the fastening hole 211 can be composed of the first cell 2115 and the second cell 2116 separated from each other by the deformable portion 212, and the deformable portion 212 can be deformed or damaged when the external impact is applied to the display apparatus 10 to buffer the impact applied to the display apparatus 10, thereby effectively suppressing the damage of the display apparatus 10.

The plurality of protrusions 210 can be formed on each of the rear cover 200, the first bracket 220, and the second bracket 230, and the fastening hole 211 in which the diameter D1 in the first direction is greater than the diameter D2 in the second direction can be defined in each protrusion 210. Such protrusions 210 can be disposed to be spaced apart from each other in a third direction, that is, a lateral direction of the display apparatus 10.

Therefore, when the external impact is applied only to a portion when viewed in the third direction, only the protrusion 210 disposed in the portion to which the external impact is applied can move in the first direction to be placed at a position different from an original position thereof. In such case, arrangement posture and shape can become different only in a portion of the display apparatus 10.

In one example, when the external impact is applied to an entirety of the display apparatus 10, all of the protrusions 210 disposed on the display apparatus 10 can move in the first direction, so that the arrangement posture and shape of the entire display apparatus 10 can be changed.

As such, the arrangement posture and shape of the portion or the entirety of the display apparatus 10 can become different due to the external impact, but the protrusion 210 moves to buffer the external impact, so that it is possible to effectively suppress damage to the display apparatus 10 resulted from the external impact.

In one example, unless the protrusion 210 of the embodiment shown in FIG. 9 is disposed, when the arrangement position and shape are changed due to the external impact, normal arrangement position and shape of the display apparatus 10 can be restored by loosening the coupling means 1000 again to return the display apparatus 10 to an original position thereof and then fastening the coupling means 1000 again.

In an embodiment, when the external impact is applied, the protrusion 210 disposed on the display apparatus 10 can move to suppress the external impact, thereby suppressing the damage to the display apparatus 10. Accordingly, durability of the display apparatus 10 can be improved, and safety of the user can be improved by suppressing fragments generated by the damage of the display apparatus 10 from injuring the user.

The display apparatus 10 according to an embodiment of the present disclosure can be described as follows.

A first aspect of the present disclosure provides a display apparatus including: a display panel; and a rear cover coupled to a rear face of the display panel to support the display panel, the rear cover includes a protrusion protruding from the rear cover and including a fastening hole defined therein and fastened with coupling means, and the fastening hole is defined such that a diameter in a first direction is greater than a diameter in a second direction orthogonal to the first direction.

In one implementation of the first aspect, the fastening hole is defined such that the diameter in the second direction increases or decreases in first direction.

In one implementation of the first aspect, the fastening hole is defined such that the diameter in the second direction decreases in a rearward direction of the display panel from a point where the diameter in the second direction is maximum.

In one implementation of the first aspect, the fastening hole includes: a first portion with the diameter in the second direction decreasing in the rearward direction of the display panel from the point where the diameter in the second direction is maximum; and a second portion with the diameter in the second direction constantly maintained in the rearward direction of the display panel from the point where the diameter in the second direction is maximum, and the first portion and the second portion are alternately arranged along the first direction.

In one implementation of the first aspect, the fastening hole includes: a first cell; and a second cell separated from the first cell and defined at a position spaced apart from the first cell, and the protrusion includes a deformable portion disposed between the first cell and the second cell to separate the first cell and the second cell from each other, and deformed or damaged when an external force is applied to the display apparatus.

In one implementation of the first aspect, the first cell has the diameter in the first direction and the diameter in the second direction that are the same, and the second cell has the diameter in the first direction smaller than the diameter in the second direction.

In one implementation of the first aspect, the first cell and the second cell are spaced apart from each other in the first direction.

In one implementation of the first aspect, the first direction is parallel to a front and rear direction of the display panel.

In one implementation of the first aspect, the protrusion includes a plurality or protrusions disposed at positions spaced apart from each other on the rear cover.

In one implementation of the first aspect, the rear cover includes a first bracket protruding from the rear cover, and the first bracket includes the protrusion protruding from the first bracket and having the fastening hole defined therein.

In one implementation of the first aspect, the rear cover includes a second bracket protruding from the rear cover and disposed at a position spaced apart from the first bracket, and the second bracket includes the protrusion protruding from the second bracket and having the fastening hole defined therein.

A second aspect of the present disclosure provides a display apparatus including: a display panel; a rear cover coupled to a rear face of the display panel to support the display panel; a first bracket coupled to the rear cover; a second bracket coupled to the rear cover and disposed at a position spaced apart from the first bracket; and a protrusion protruding from at least one of the rear cover, the first bracket, and the second bracket, and having a fastening hole defined therein and fastened with coupling means, and the fastening hole is defined such that a diameter in a first direction is greater than a diameter in a second direction orthogonal to the first direction.

In one implementation of the second aspect, the fastening hole is defined such that the diameter in the second direction decreases in a rearward direction of the display panel from a point where the diameter in the second direction is maximum.

In one implementation of the second aspect, the fastening hole includes: a first portion with the diameter in the second direction decreasing in the rearward direction of the display panel from the point where the diameter in the second direction is maximum; and a second portion with the diameter in the second direction constantly maintained in the rearward direction of the display panel from the point where the diameter in the second direction is maximum, and the first portion and the second portion are alternately arranged along the first direction.

In one implementation of the second aspect, the fastening hole includes: a first cell; and a second cell separated from the first cell and defined at a position spaced apart from the first cell, and the protrusion includes a deformable portion disposed between the first cell and the second cell to separate the first cell and the second cell from each other, and deformed or damaged when an external force is applied to the display apparatus.

Various embodiments described herein may be implemented in a computer-readable medium using, for example, software, hardware, or some combination thereof. For example, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, other electronic units designed to perform the functions described herein, or a selective combination thereof. In some cases, such embodiments are implemented by the controller. That is, the controller is a hardware-embedded processor executing the appropriate algorithms (e.g., flowcharts) for performing the described functions and thus has sufficient structure. Also, the embodiments such as procedures and functions may be implemented together with separate software modules each of which performs at least one of functions and operations. The software codes can be implemented with a software application written in any suitable programming language. Also, the software codes can be stored in the memory and executed by the controller, thus making the controller a type of special purpose controller specifically configured to carry out the described functions and algorithms. Thus, the components shown in the drawings have sufficient structure to implement the appropriate algorithms for performing the described functions.

The present disclosure as described above is not limited to the above-described embodiments and the accompanying drawings. It will be apparent to those of ordinary skill in the technical field to which the present disclosure belongs that various substitutions, modifications and changes can be made within the scope not departing from the technical ideas of the present disclosure. Therefore, the scope of the present disclosure is indicated by the following claims, and all changes or modifications derived from the meaning and scope of the claims and their equivalent concepts should be construed as being included in the scope of the present disclosure.

What is claimed is:

1. A display apparatus comprising:
a display panel; and
a rear cover coupled to the display panel and supporting the display panel,
wherein the rear cover includes a protrusion protruding from the rear cover,
wherein the protrusion includes a fastening hole,
wherein a first length of the fastening hole in a first direction is greater than a second length of the fastening hole in a second direction orthogonal to the first direction,
wherein the fastening hole includes:
a first cell; and
a second cell separated from the first cell and spaced apart from the first cell, and
wherein the protrusion includes a deformable portion disposed between the first cell and the second cell to separate the first cell from the second cell.

2. The display apparatus of claim 1,
wherein the deformable portion is configured to absorb an external force applied to the display apparatus.

3. The display apparatus of claim 2, wherein the first cell has a circular shape, and
wherein the second cell has first length in the first direction smaller than a second length in the second direction.

4. The display apparatus of claim 2, wherein the first cell and the second cell are spaced apart from each other in the first direction.

5. The display apparatus of claim 1, wherein the first direction is parallel to an axis passing through a front and a rear of the display panel.

6. The display apparatus of claim 1, wherein the protrusion is a first protrusion among a plurality of protrusions disposed at positions spaced apart from each other on the rear cover.

7. The display apparatus of claim 6, wherein the rear cover includes a first bracket protruding from the rear cover, and
wherein the first bracket includes the first protrusion protruding from the first bracket and having the fastening hole defined therein.

8. The display apparatus of claim 7, wherein the rear cover includes a second bracket protruding from the rear cover and disposed at a position spaced apart from the first bracket, and
wherein the second bracket includes a second protrusion protruding from the second bracket among the plurality of protrusions, the second protrusion having a fastening hole.

9. A display apparatus comprising:
a display panel;
a rear cover coupled to a rear face of the display panel and supporting the display panel;
a first bracket coupled to the rear cover;
a second bracket coupled to the rear cover and disposed at a position spaced apart from the first bracket; and
a protrusion protruding from at least one of the rear cover, the first bracket, and the second bracket,
wherein the protrusion includes a fastening hole,
wherein a first length of the fastening hole in a first direction is greater than a second length of the fastening hole in a second direction orthogonal to the first direction, and
wherein the second length of the fastening hole decreases in a rearward direction of the display panel from a maximum length of the fastening hole in the second direction.

10. A display apparatus comprising:
a display panel;
a rear cover coupled to the display panel and including a protrusion,
wherein the protrusion is configured to attach the display apparatus to a fixture and includes a fastening hole having a variable shape,
wherein the fastening hole includes:
a first cell; and
a second cell separated from the first cell and spaced apart from the first cell, and
wherein the protrusion includes a deformable portion disposed between the first cell and the second cell to separate the first cell from the second cell.

11. The display apparatus of claim 10, wherein the display panel is configured to move in the first direction by the fastening hole, and wherein the first direction is parallel with a front and rear direction of the display panel.

* * * * *